US012789939B2

(12) United States Patent
Henry et al.

(10) Patent No.: US 12,789,939 B2
(45) Date of Patent: Nov. 10, 2026

(54) BICYCLE HANDLEBAR STEM

(71) Applicant: Bastille Cycles, Paris (FR)

(72) Inventors: Gilles Henry, Paris (FR); Fabien Proust, Paris (FR); Francisco Cervantes, Chaville (FR)

(73) Assignee: Bastille Cycles, Paris (FR)

(*) Notice: Subject to any disclaimer, the term of this patent is extended or adjusted under 35 U.S.C. 154(b) by 0 days.

(21) Appl. No.: 18/889,947

(22) Filed: Sep. 19, 2024

(65) Prior Publication Data

US 2025/0091687 A1 Mar. 20, 2025

(30) Foreign Application Priority Data

Sep. 19, 2023 (FR) ....................................... 2309874

(51) Int. Cl.
*B62K 21/16* (2006.01)

(52) U.S. Cl.
CPC .................................... *B62K 21/16* (2013.01)

(58) Field of Classification Search
None
See application file for complete search history.

(56) References Cited

U.S. PATENT DOCUMENTS 10,046,825 B1 * 8/2018 Chen ...................... B62K 21/24
2006/0099027 A1 * 5/2006 Liao ...................... B62K 21/12 403/322.4
2011/0072635 A1 * 3/2011 Lee ..................... B25B 27/0071 29/505

FOREIGN PATENT DOCUMENTS

DE 102011054696 A1 10/2012
EP 3634842 B1 2/2021
NL 2005592 A 5/2011

* cited by examiner

*Primary Examiner* — Vicky A Johnson
(74) *Attorney, Agent, or Firm* — Osha Bergman Watanabe & Burton LLP

(57) ABSTRACT

A bicycle handlebar stem comprising a base (19) designed to be fixedly connected to the steering pivot (8) of a bicycle and a handlebar stem body (9) to which a bicycle handlebar (3) can be fixed. The handlebar stem body (9) can be detachably connected to the base (19) by means of a bayonet fitting. The bayonet fitting makes it possible to connect the handlebar stem body (9) to the base (19) by pushing the handlebar stem body (9) against the base (19), along an engagement axis (A), and then by rotating the handlebar stem body (9) relative to the base (19), about the engagement axis (A).

11 Claims, 10 Drawing Sheets

BICYCLE HANDLEBAR STEM

TECHNICAL FIELD

The invention relates to a bicycle handlebar stem. This handlebar stem can be mounted on any type of bicycle.

BACKGROUND

A bicycle handlebar stem is a part which joins the handlebar of a bicycle to the steering pivot, also referred to as fork pivot, in the upper part of the fork of the bicycle. Some bicycles are fitted with a handlebar stem which makes it possible to turn the handlebar through 90° relative to the steering pivot in order to orient the handlebar substantially parallel to the median plane of the front wheel of the bicycle. The handlebar then does not protrude to either side of the front wheel, and this makes it possible to stow the bicycle more easily. Handlebar stems of this type are described, for example, in patent documents NL 2005592 A and DE 102011054696 A1. However, these handlebar stems do not make it possible to quickly detach the handlebar from the rest of the bicycle. As a matter of fact, detaching the handlebar could prove useful for preventing use of the bicycle (and, thus, reducing the risk of theft) or for making it easier to stow.

There is therefore a need for a bicycle handlebar stem which makes it possible not only to modify the orientation of the handlebar with respect to the steering pivot simply (which is to say without having to dismount the part and without using a particular tool), but also to simply and quickly detach the handlebar from the rest of the bicycle, while at the same time ensuring a robust and reliable mechanical connection between the handlebar and the steering pivot in the use position.

GENERAL SUMMARY

A bicycle handlebar stem according to the invention comprises a base designed to be fixedly connected to the steering pivot of the bicycle and a handlebar stem body to which the handlebar of the bicycle can be fixed. The handlebar stem body can be detachably connected to the base by means of a bayonet fitting.

The bayonet fitting makes it possible to connect the handlebar stem body to the base by pushing the handlebar stem body against the base, along an engagement axis, and then by rotating the handlebar stem body (in a first direction of rotation) relative to the base, about the engagement axis. This makes it possible to easily and quickly attach the handlebar stem body, and the handlebar along with it, to the rest of the bicycle. This property is referred to below as "quick attachment".

Conversely, the bayonet fitting makes it possible to disconnect (i.e. detach) the handlebar stem body from the base by turning the handlebar stem body about the engagement axis (in the opposite direction to the first direction of rotation) and by axially pulling on the handlebar stem body to separate it from the base. This makes it possible to easily and quickly detach the handlebar stem body, and the handlebar along with it, from the rest of the bicycle. This property is referred to below as "quick release".

In addition, the bayonet fitting makes it possible to modify the orientation of the handlebar relative to the steering pivot simply, as explained in detail below. Lastly, the bayonet fitting has the advantage of being simple and robust.

To reinforce the connection of the handlebar stem body to the base in the use position, without adversely affecting the property of quick attachment/release, the bicycle handlebar stem may further comprise a hook mounted on the handlebar stem body. This hook is designed to catch in a first notch formed in the base in order to immobilize the handlebar stem body in a use position. In the use position, when the hook is caught in the first notch, the handlebar stem body is rotationally fixed to the base about the engagement axis and translationally fixed to the base along the engagement axis. In other words, catching the hook in the first notch fixes the relative position between the handlebar stem body and the base, and this makes it possible to ride the bicycle.

In some embodiments, the handlebar stem body is hollow and the base is designed to be engaged inside the handlebar stem body.

In some embodiments, the bayonet fitting comprises at least one radial finger and at least one groove. Each groove comprises a circumferential segment in the form of a circular arc about the engagement axis and an axial segment parallel to the engagement axis. For example, each groove has the overall shape of an L. Each radial finger can be engaged and slide in the groove which corresponds to it.

In some embodiments, each radial finger projects into the hollow handlebar stem body and each groove is formed in the periphery of the base.

Another subject of the invention is a bicycle comprising a handlebar, a steering pivot and a handlebar stem according to the invention, the handlebar stem connecting the handlebar to the steering pivot. The bicycle may have two or more wheels (bike, tricycle, etc.), be motorized or not motorized (electric bicycle, pedelec, moped, etc.), be foldable or not foldable; the invention is not limited to any type of bicycle.

Other features and advantages of the invention will become more apparent on reading the following detailed description. This detailed description refers to the appended drawings.

BRIEF DESCRIPTION OF THE DRAWINGS

The appended drawings are schematic and are not necessarily shown to scale; their primary aim is to illustrate the principles of the invention. In the drawings, from one figure (FIG.) to the next, elements (or parts of an element) that are identical are given the same reference signs.

DETAILED DESCRIPTION

Figure 1:
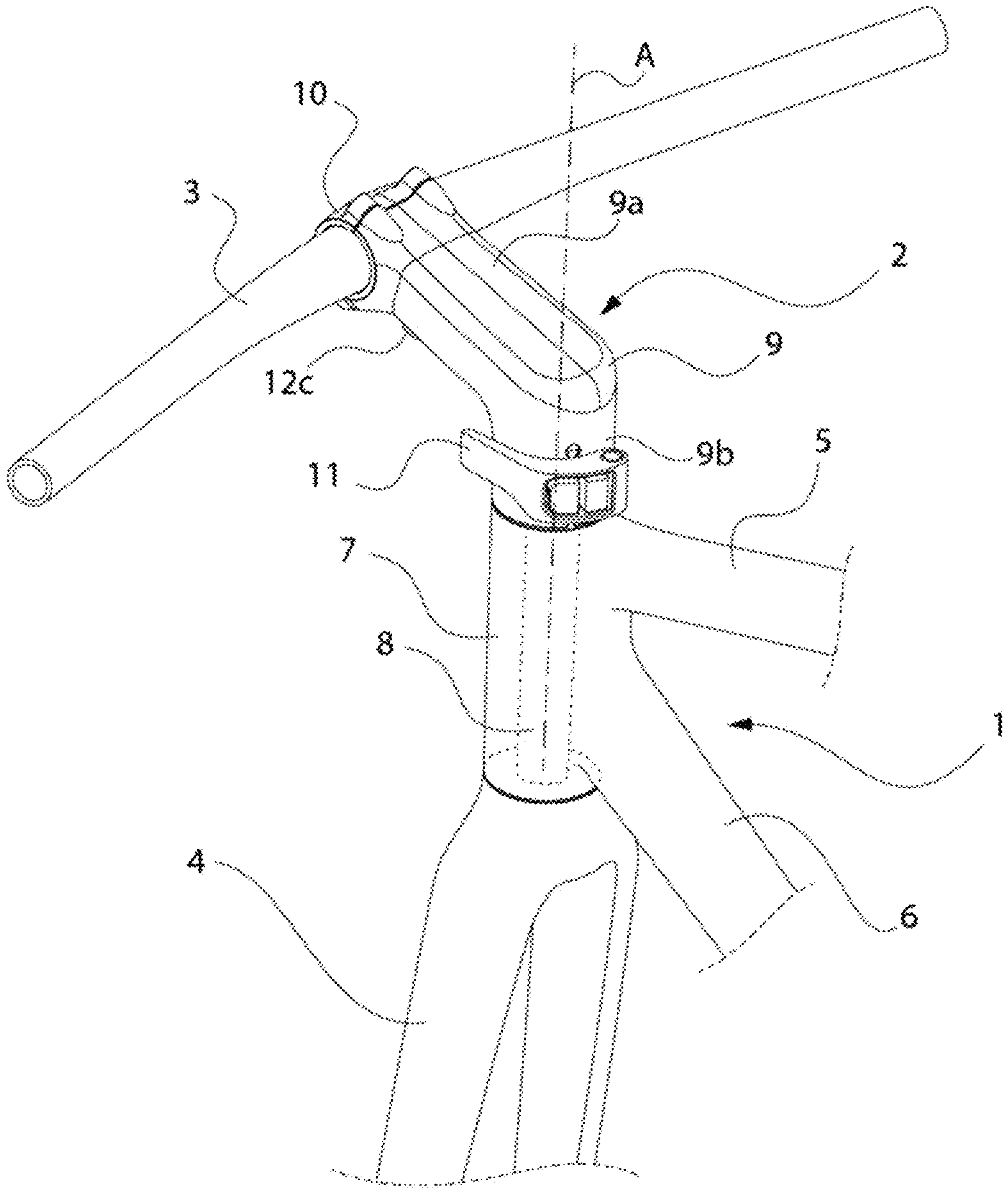
FIG. 1 is a perspective view of the upper part of the fork of a bicycle equipped with an exemplary bicycle handlebar stem according to the invention.

Particular embodiments of the proposed bicycle handlebar stem are described in detail below. Some modes are described with reference to the example shown in the appended drawings. These embodiments illustrate the features and the advantages of the invention. However, the invention is not limited either to these embodiments or to the example shown.

In some embodiments and in the example shown in the figures, the handlebar stem 2 comprises a base 19 designed to be fixedly connected to the steering pivot 8 of a bicycle 1, and a handlebar stem body 9 to which a bicycle handlebar 3 can be fixed. The steering pivot 8 is connected to the fork 4 of the bicycle 1. The steering pivot 8 is rotatably mounted in the steering tube 7 situated at the front of the bicycle 1. The base 19 is fixedly connected to the steering pivot 8. In the example shown, the steering tube 7 is at the junction between the top tube 5 and the down tube 6 of the bicycle frame.

In some embodiments and in the example shown, the base 19 is fixedly connected to the steering pivot 8 by a known system of the plunger type, comprising an axial tube 20 extending inside the steering pivot 8, a tightening screw 24 extending inside the axial tube 20, and a wedge 22 connected to the tightening screw 24. The axial tube 20 is surmounted by a wider part forming the head 49 of the base 19. One end (i.e. the screw head) of the tightening screw 24 bears against the head 49 of the base 19 and the other end of the screw 24 is screwed in the wedge 22. The lower end of the axial tube 20 has a first oblique surface 21 and the upper end of the wedge 22 has a second oblique surface 23. When the screw 24 is unscrewed, the wedge 22 is axially centred and does not oppose the sliding of the axial tube 20 inside the steering pivot 8 which surrounds it. When the screw 24 is screwed in, the oblique surfaces 21, 23 come into contact with one another, and this causes the wedge 22 to be off-centre (i.e. radially offset). The wedge 22 then opposes the sliding of the axial tube 20 inside the steering pivot. Other fixing systems may be envisaged for fixedly connecting the base 19 to the steering pivot 8 without departing from the scope of the invention.

In the example shown, the handlebar 3 is fixed at the front end of the handlebar stem body 9 by a jaw 10 which can be clamped shut by means of screws 18.

The handlebar stem body 9 can be detachably connected to the base 19 by means of a bayonet fitting. The bayonet fitting makes it possible to connect the handlebar stem body 9 to the base 19 by pushing the handlebar stem body 9 against the base 19, along an engagement axis A, and then by rotating the handlebar stem body 9 relative to the base 19, about the engagement axis A. In the example in the figures, the engagement axis A corresponds to the axis of rotation of the steering pivot 8. The bayonet fitting makes it possible to quickly attach the handlebar stem body 9 to the base 19 and to quickly detach the handlebar stem body 9 from the base 19.

In some embodiments and in the example in the figures, the handlebar stem body 9 has a bent shape with a bottom part 9*b* extending along the engagement axis A and a top part 9*a* forming an angle with the bottom part 9*b*. The top part 9*a* extends towards the front of the bicycle when the handlebar stem 2 is in the use position and when the front and rear wheels of the bicycle 1 are in line; cf. FIGS. 1 and 2. The lower end of the bottom part 9*b* can be connected to the base 19. The handlebar 3 is fixed at the front end of the top part 9*a*.

In the present application, the horizontal and the vertical are defined with respect to the use position of the bicycle 1 on a horizontal surface. The top and the bottom are defined with respect to the vertical direction. The front and the rear are defined with respect to the normal direction of movement of the bicycle 1. The axial direction corresponds to the direction of the engagement axis A. A radial direction is a direction perpendicular to the engagement axis A and intersecting this axis. Similarly, an axial plane is a plane containing the engagement axis A and a radial, or transverse plane is a plane perpendicular to this axis. Lastly, unless specified otherwise, the adjectives inner and outer are used with reference to a radial direction such that the inner part of an element is closer to the engagement axis A in a radial direction than the outer part of the same element is.

In some embodiments and in the example shown, the bayonet fitting comprises at least one radial finger 37*a*, 37*b* and at least one L-shaped groove 46*a*, 46*b*. Each groove 46*a*, 46*b* comprises a circumferential segment 36*a*, 36*b* in the form of a circular arc about the engagement axis A and an axial segment 26*a*, 26*b* parallel to the engagement axis A. Each radial finger 37*a*, 37*b* can be engaged and slide in the groove 46*a*, 46*b* which corresponds to it. In the example in the figures, the bayonet fitting comprises two radial fingers 37*a*, 37*b* which are diametrically opposite with respect to the engagement axis A, and two corresponding grooves 46*a*, 46*b*; cf. FIGS. 4, 5, 9 and 10.

In some embodiments and in the example shown in the figures, when each radial finger 37*a*, 37*b* is engaged in the groove 46*a*, 46*b* which corresponds to it, the handlebar stem body 9 can be rotated relative to the base 19, about the engagement axis A, between a use position in which the radial finger 37*a*, 37*b* is at one end of the circumferential segment 36*a*, 36*b* and a disconnection position in which the radial finger 37*a*, 37*b* is at the other end of the circumferential segment 36*a*, 36*b* in line with the axial segment 26*a*, 26*b*. In the use position, shown in FIGS. 1, 7 and 9, the axial movement of the handlebar stem body 9 relative to the base 19 is prevented by the engagement of the radial finger 37*a*, 37*b* in the circumferential segment 36*a*, 36*b*. From the disconnection position, shown in FIGS. 3 and 10, the handlebar stem body 9 can be disconnected from the base 19 by sliding the radial finger 37*a*, 37*b* in the axial segment 26*a*, 26*b* so as to bring the radial finger 37*a*, 37*b* out of the groove 46*a*, 46*b*. The disconnection position is thus an intermediate position, between the use position and the disconnected position, from which the handlebar stem body 9 can be easily disconnected from the base 19. Further, in this disconnection position, the handlebar 3 has reduced bulk, since the handlebar (i.e. the overall direction of the handlebar) is not oriented perpendicularly to the median plane of the front wheel of the bicycle but rather parallel thereto.

Figure 2:
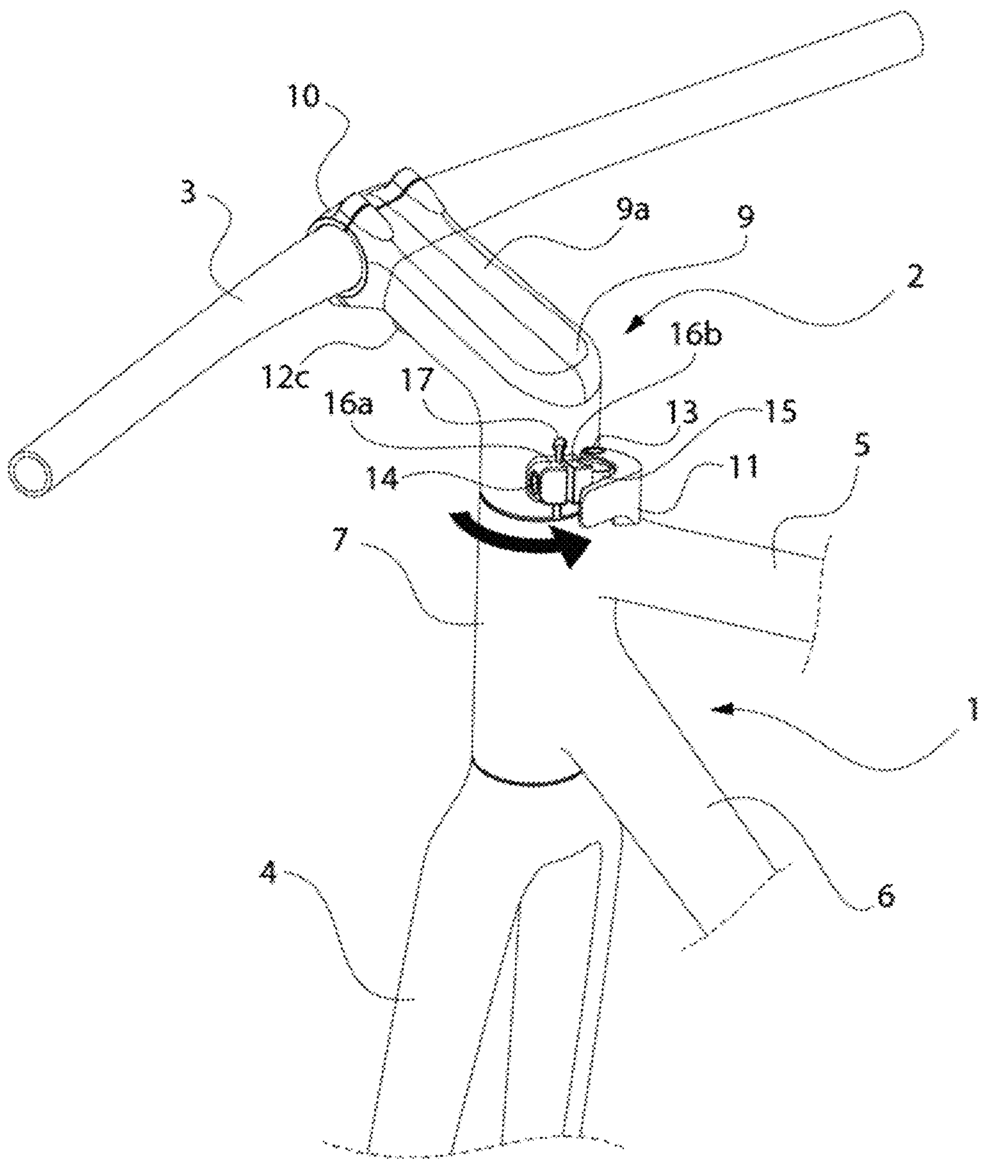
FIG. 2 is a view similar to that of FIG. 1, in which the clamping system of the handlebar stem is unclamped.
Figure 3:
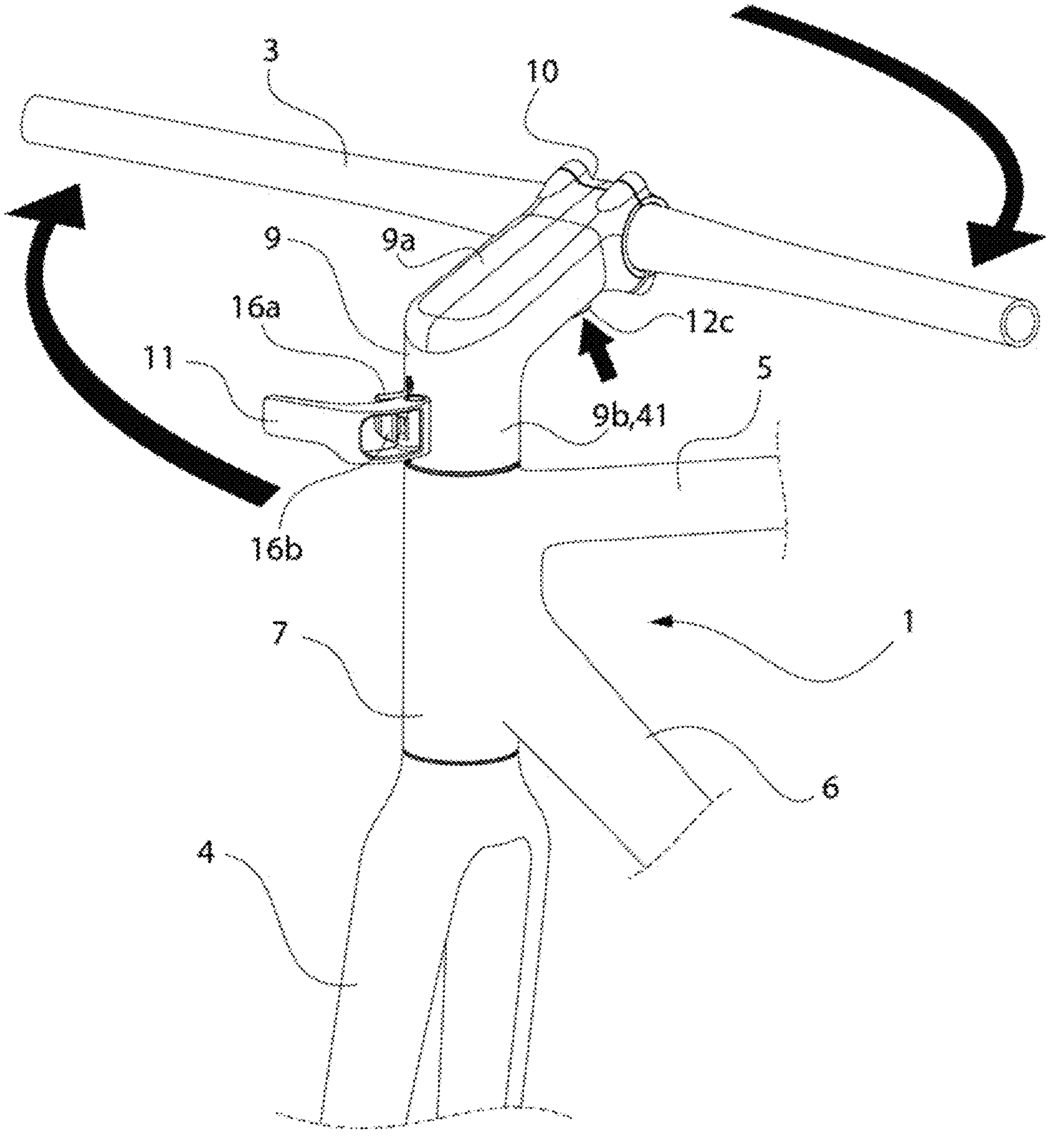
FIG. 3 is a view similar to that of FIGS. 1 and 2, in which the handlebar stem body and the handlebar of the bicycle are turned by 90° relative to the steering pivot of the bicycle.

In some embodiments and in the example shown in the figures, the use position and the disconnection position are angularly spaced by a rotational angle of 90° about the engagement axis A. FIGS. 2 to 3 illustrate the passage from the use position to the disconnection position. In FIG. 2, the handlebar stem body 9 is in its use position. In the use position, the handlebar 3 is oriented perpendicularly to the median plane of the front wheel and cannot be detached from the base 19. In the disconnection position, the handlebar 3 is oriented parallel to the median plane of the front wheel (the bulk of the handlebar 3 is then minimized) and can be easily detached from the base 19.

As illustrated by the two curved arrows in FIG. 3, to disconnect the handlebar stem body 9 from the base 19, the handlebar 3 is turned through 90° with respect to the median plane of the front wheel. The handlebar stem body 9 is thus brought into the disconnection position. It is then possible to disconnect, or detach, the handlebar stem body 9 from the base 19 by pulling it axially upwards, as illustrated by the arrow in FIG. 4. The handlebar 3 is then detached from the rest of the bicycle 1. The bicycle 1 cannot be used without its handlebar 3, and this reduces the risk of theft. In addition, the bicycle 1 is even less bulky without its handlebar 3, and this makes it easier to stow. This is of particular advantage in the case of a foldable bicycle, since the handlebar 3 can be detached to minimize the bulk of the folded bicycle. An example of a foldable bicycle is described in European patent EP 3634842 B1.

Figure 4:
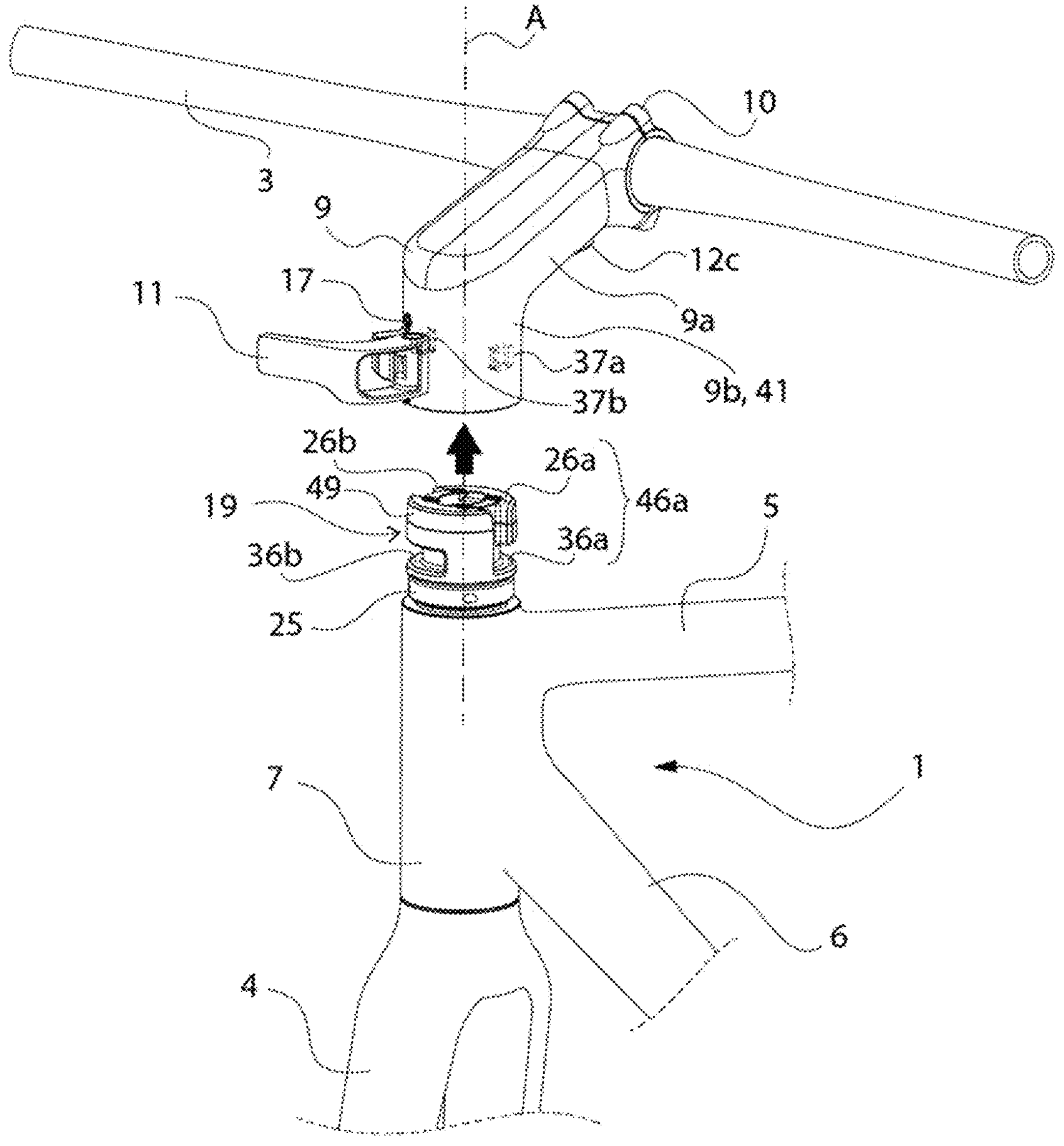
FIG. 4 is a view similar to that of FIGS. 1 to 3, in which the handlebar stem body and the handlebar are detached.
Figure 5:
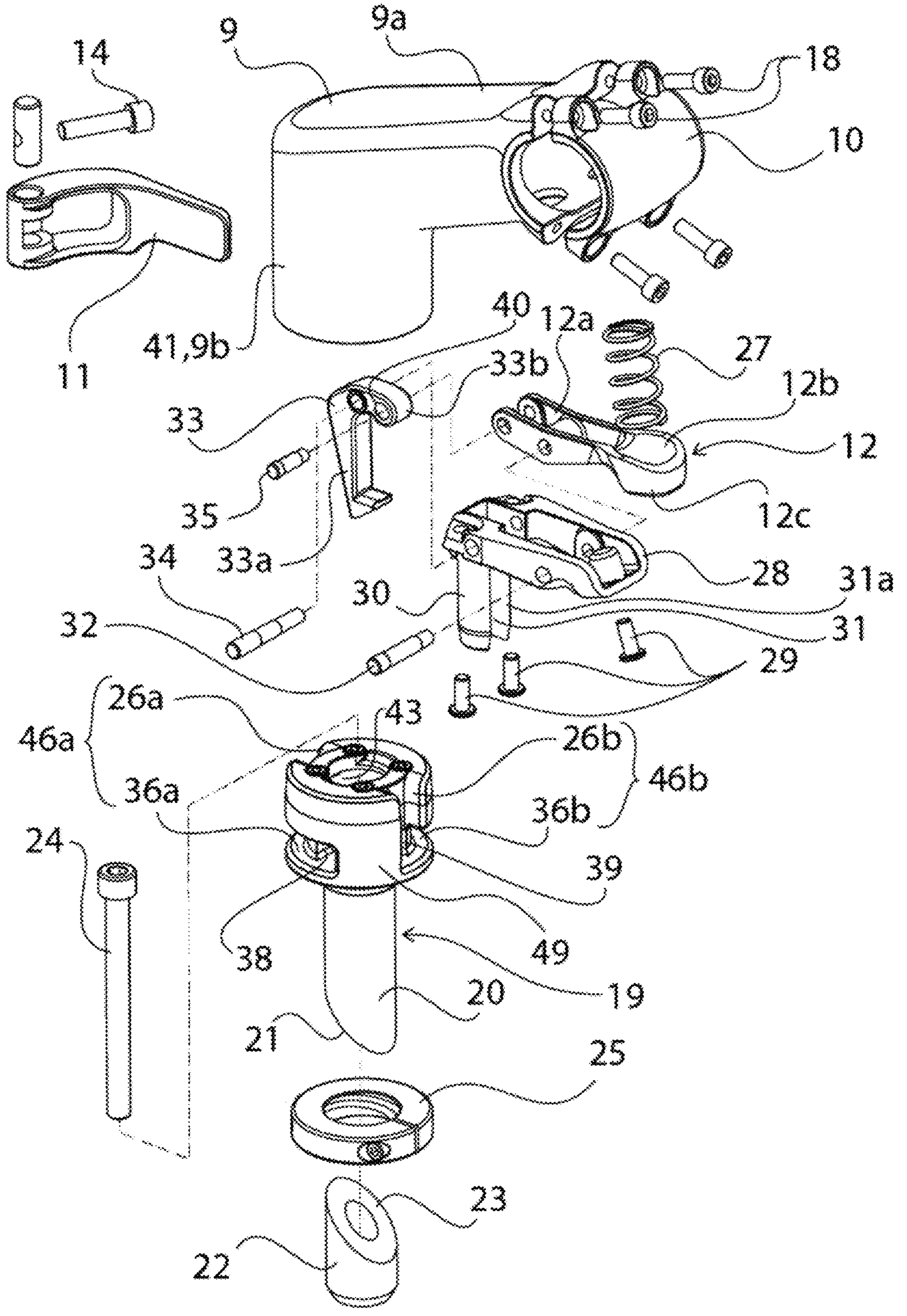
FIG. 5 is an exploded view of an exemplary handlebar stem according to the invention.
Figure 6:
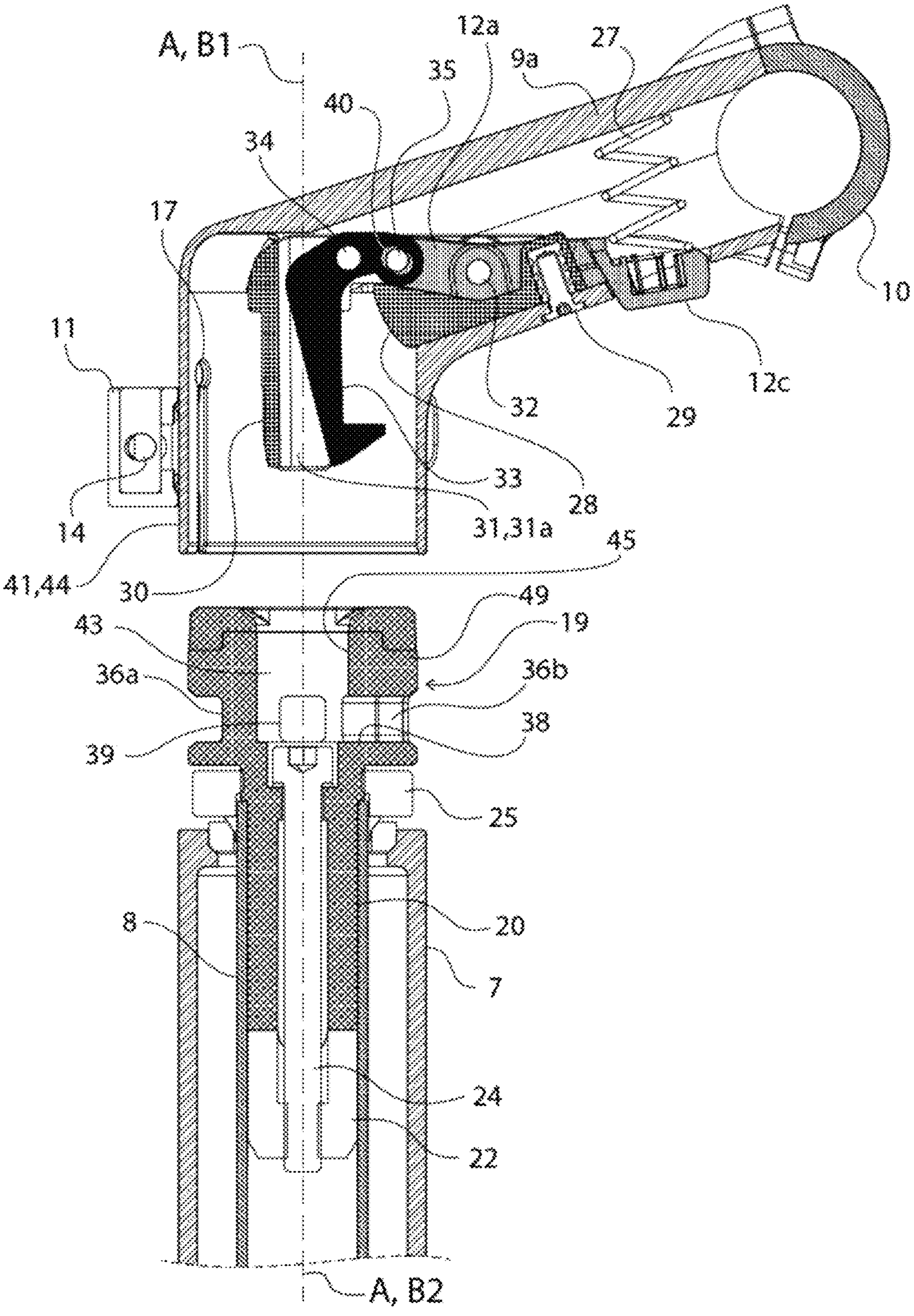
FIG. 6 is a view in axial section of the handlebar stem in FIG. 5 when the handlebar stem body is detached.

Conversely, to attach the handlebar 3 to the rest of the bicycle 1 from the position in FIG. 4, the handlebar stem body 9 is pushed axially downwards against the base 19, in the opposite direction to the arrow in FIG. 4. The handlebar stem body 9 is thus brought into the disconnection position in FIG. 3. From this disconnection position, the handlebar stem body 9 is turned in the opposite direction to the arrows in FIG. 3 as far as the use position in FIG. 2.

Figure 7:
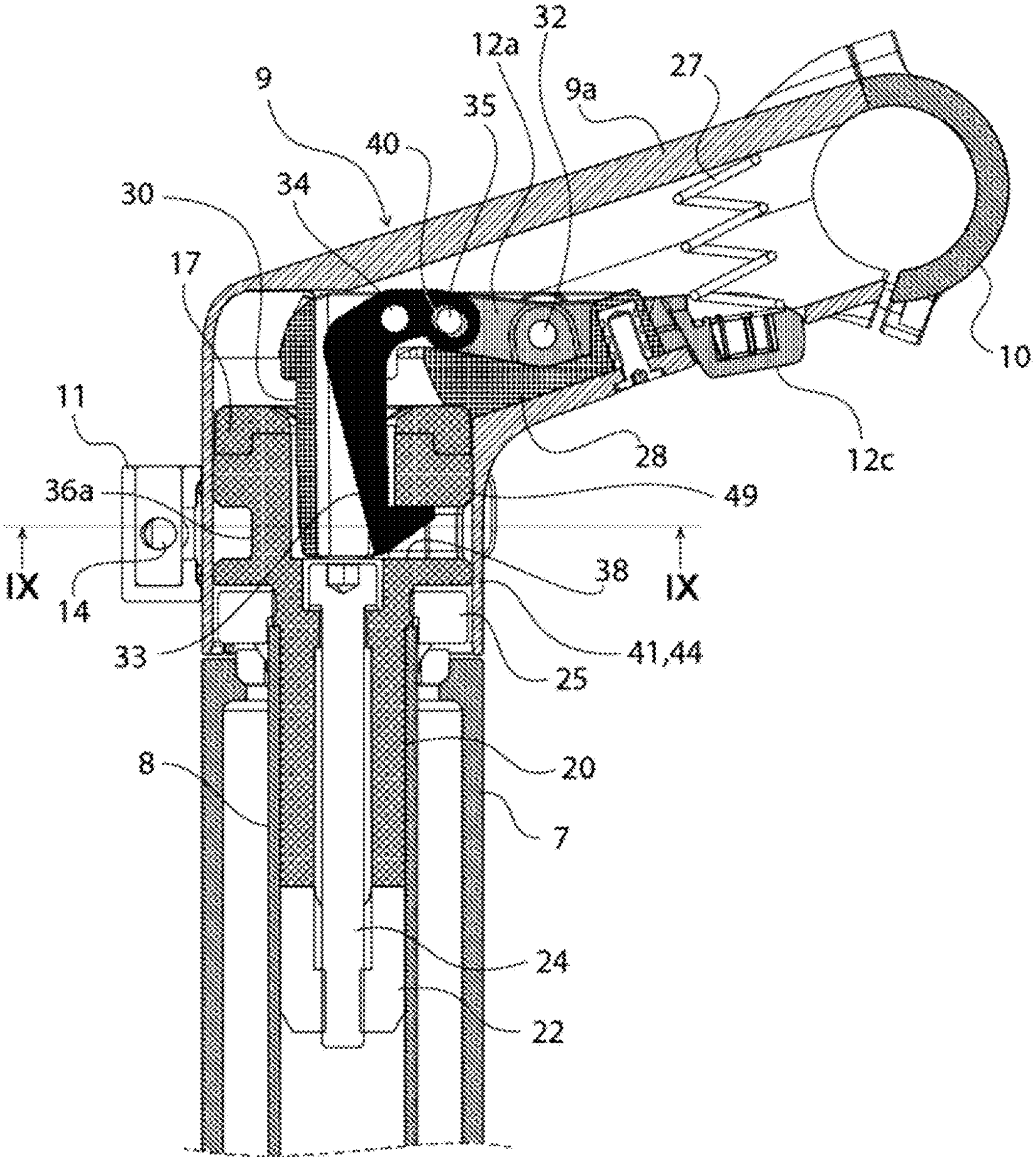
FIG. 7 is a view in axial section of the handlebar stem when the handlebar stem body is attached to the rest of the bicycle.
Figure 9:
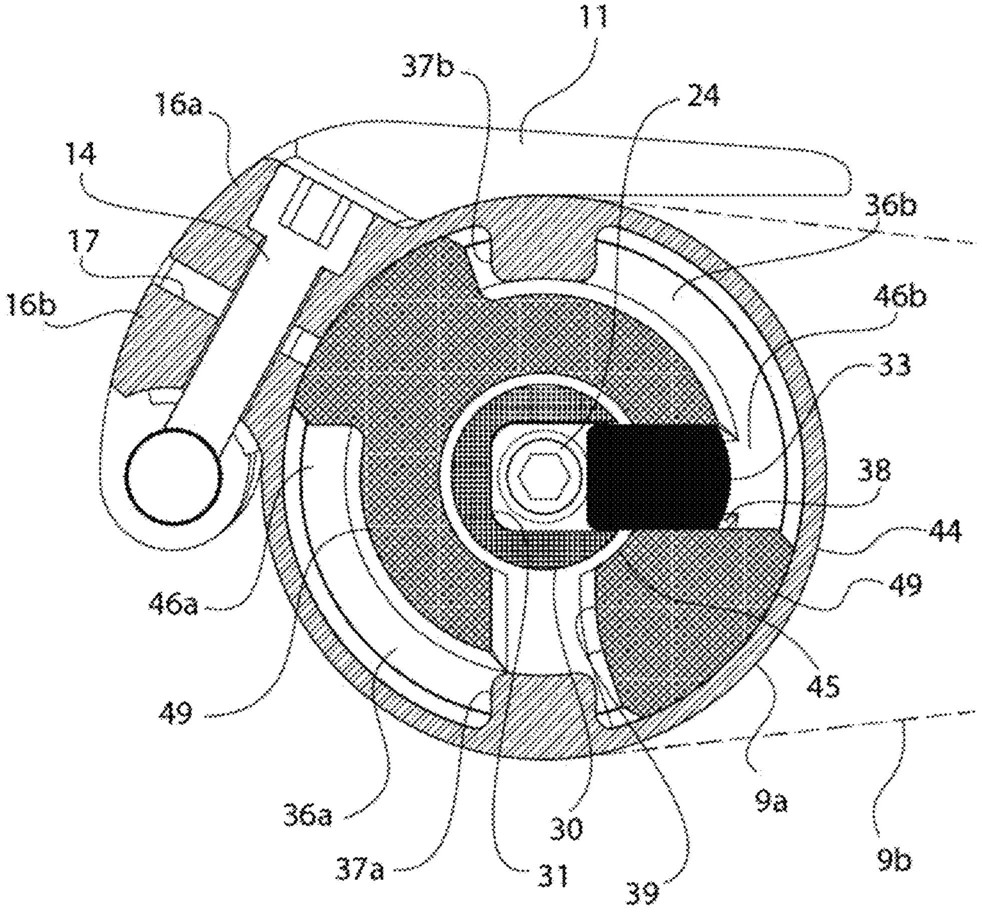
FIG. 9 is a view in cross section of the handlebar stem through the plane IX-IX in FIG. 7, in which the clamping system of the handlebar stem is clamped.

In some embodiments and in the example shown in the figures, the handlebar stem 2 comprises a hook 33 mounted on the handlebar stem body 9 and designed to catch in a first notch 38 formed in the base 19 in order to immobilize the handlebar stem body 9 in the use position. In other words, when the hook 33 is caught in the first notch 38, as shown in FIGS. 7 and 9, it is no longer possible to move, in particular turn, the handlebar stem body 9 relative to the base 19: the handlebar stem body 9 is rotationally and axially translationally fixed to the base 19. In this use position, the steering pivot 8 and, with it, the fork 4 and the front wheel of the bicycle can be oriented in the desired direction by turning the handlebar 3. In other words, in the use position, it is possible to ride the bicycle.

In some embodiments and in the example shown in the figures, the hook 33 is designed to catch in a second notch 39 formed in the base 19 in order to immobilize the handlebar stem body 9 in the disconnection position. In other words, when the hook 33 is caught in the second notch 39, the handlebar stem body 9 is in the disconnection position and it is no longer possible to move, in particular turn, the handlebar stem body 9 relative to the base 19: the handlebar stem body 9 is rotationally and axially translationally fixed to the base 19.

Figure 8:
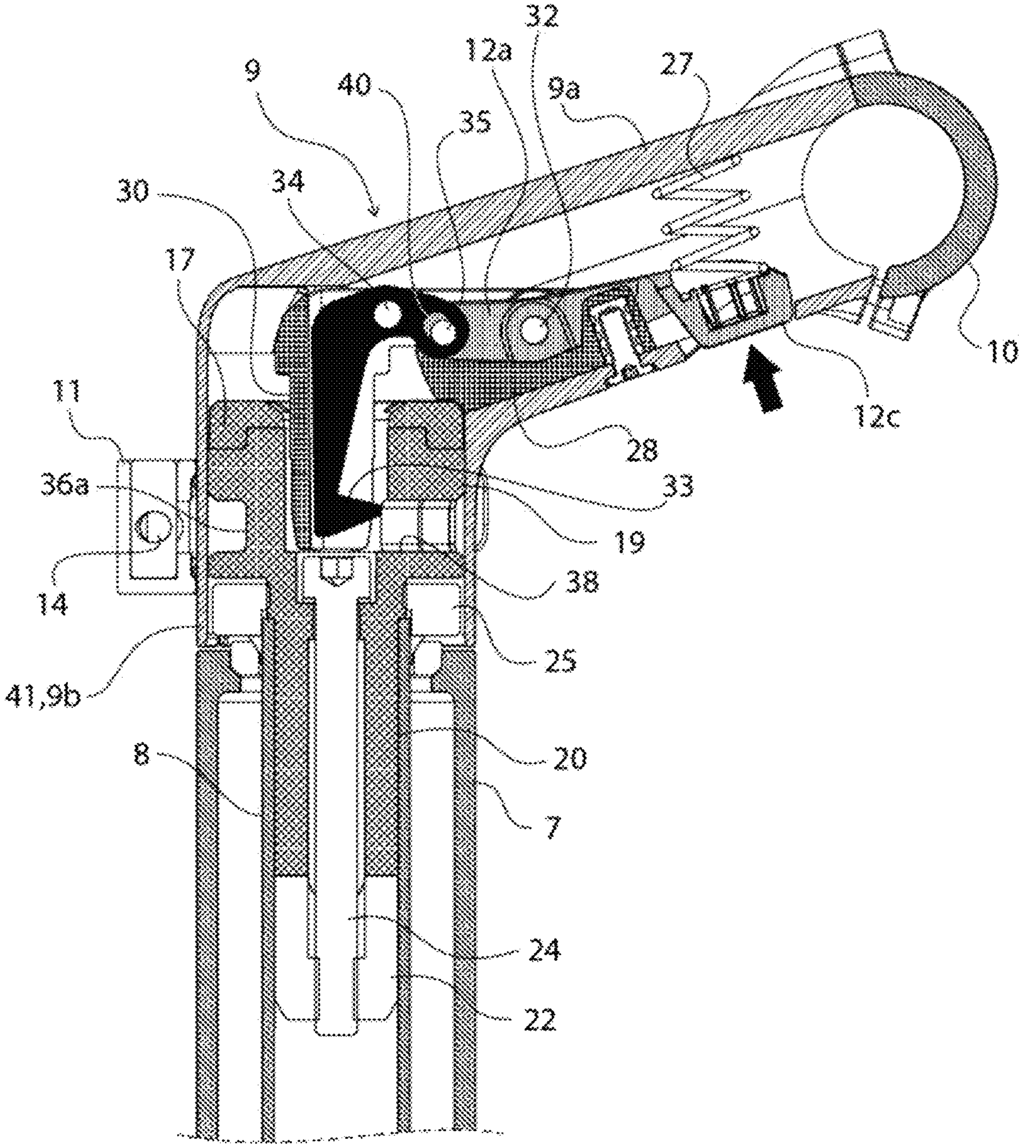
FIG. 8 is a view in axial section similar to that in FIG. 7, but in which the hook of the handlebar stem is unhooked.
Figure 10:
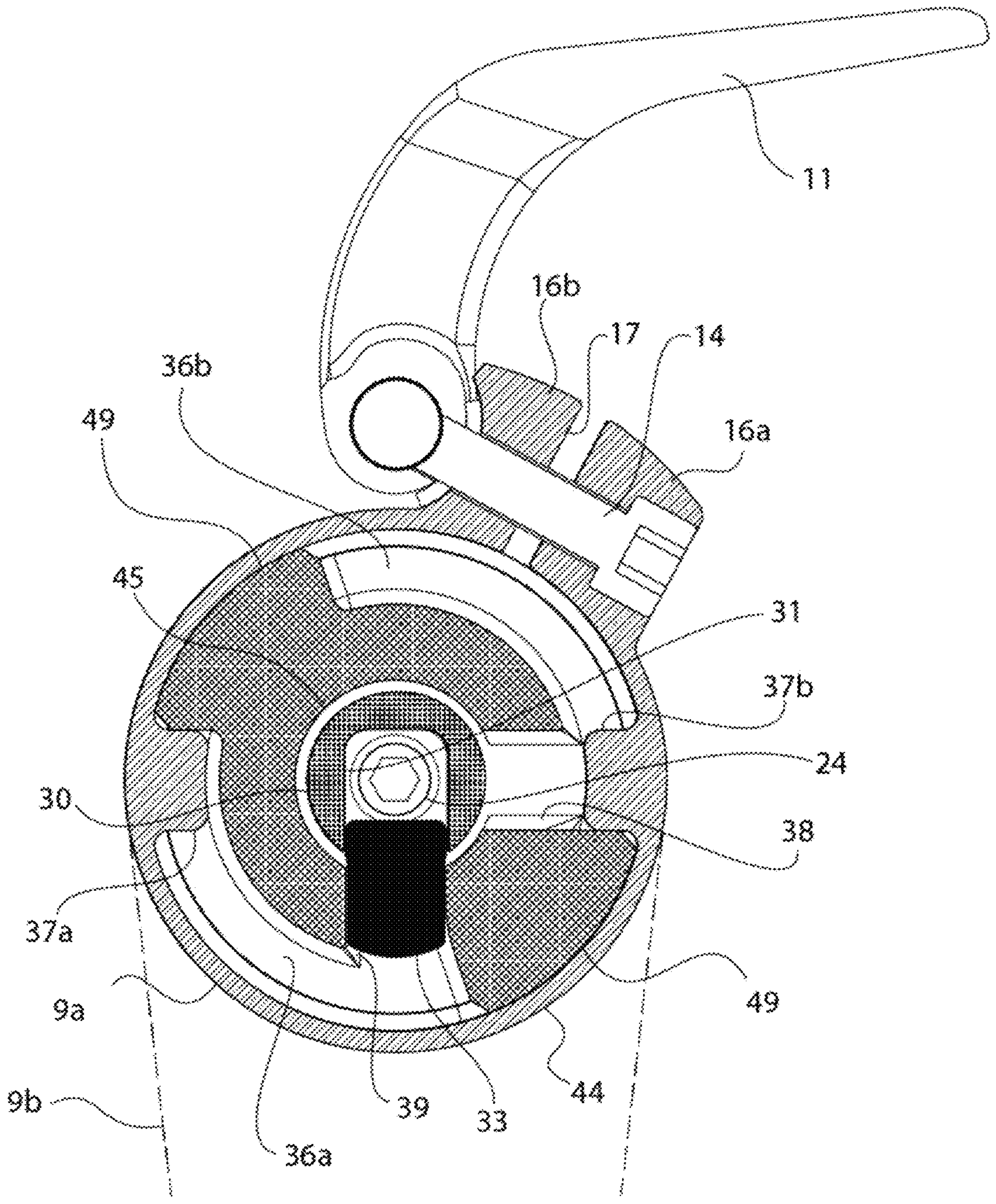
FIG. 10 is another view in cross section of the handlebar stem, similar to that in FIG. 9, in which the clamping system of the handlebar stem is unclamped.

FIGS. 7 and 8 show the hook 33 in a caught position and in an unhooked position, respectively. FIGS. 9 and 10 show the hook 33 caught in the first notch 38 and in the second notch 39, respectively.

In some embodiments and in the example shown in the figures, the hook 33 is pivotably mounted on the handlebar stem body 9 and can be actuated by means of a lever 12. In the example in the figures, the hook 33 is pivotably mounted about a second pin 34 supported by the handlebar stem body 9. The hook 33 is rotated about the second pin 34 by a lever 12, which is itself pivotably mounted about a first pin 32 supported by the handlebar stem body 9. The hook 33 comprises an axial arm 33*a* and a radial arm 33*b* extending on either side of the second pin 34. The lever 12 comprises two arms 12*a*, 12*b* extending on either side of the first pin 32. The first arm 12*a* of the lever extends on one side of the first pin 32 and is connected to the radial arm 33*b* of the hook 33. The second arm 12*b* of the lever 12 extends on the other side of the first pin 32 and forms a pushbutton 12*c* which the user can press on to rotate the lever 12 about the first pin 32, as illustrated by the arrows in FIGS. 3 and 8. The button 12*c* is situated in the top part 9*a* of the handlebar stem body 9. In the example, a spring 27 is provided inside the handlebar stem body 9 to keep the lever 12 in a stable position, shown in FIG. 7, in which the button 12*c* is in its non-depressed position, and the hook 33 is in its unhooked position. In the example, in the non-depressed position, the button 12*c* protrudes from the lower surface of the top part 9*a* of the handlebar stem body 9 so as to be more accessible and easily manipulatable.

In the example in the figures, the first and second pins 32, 34 are embodied by spindles passing through the hook 33 and the lever 12 and each supported by two bearings formed in the lateral walls of a support 28 which is part of the handlebar stem body 9. The support 28 is accommodated inside the constituent casing of the handlebar stem body 9 and is fixed to this casing via screws 29. The actuation mechanism of the hook 33 is thus protected from external impacts. However, other configurations can be envisaged. In particular, the support 28 may be formed in one piece with the rest of the handlebar stem body 9.

In some embodiments and in the example in the figures, the radial arm 12*a* of the lever 12 bears a peg 35. Further, an oblong opening 40 is formed in the radial arm 33*b* of the hook 33. The oblong opening 40 and the lever 12 are configured such that the peg 35 moves in and along the oblong opening 40 while the lever 12 is being rotated about the first pin 32. The movement of the peg 35 in the oblong opening 40 then makes the hook 33 pivot about the second pin 34, as illustrated in FIGS. 7 and 8.

In some embodiments and in the example in the figures, the handlebar stem body 9 comprises a fixing foot 41 of cylindrical overall shape about a first axis of revolution B1, while the base 19 comprises a fixing head 49 of cylindrical overall shape about a second axis of revolution B2. The fixing foot 41 and the fixing head 49 are designed to be coaxially engaged in one another. In the example in the figures, the fixing foot 41 forms the bottom part 9*b* of the handlebar stem body 9. The first axis of revolution B1 and the second axis of revolution B2 are in line with one another and with the engagement axis A when the fixing foot 41 and the fixing head 49 are engaged one in the other.

In some embodiments and in the example shown, the fixing foot 41 comprises a sleeve 44 having the first axis of revolution B1 as central axis, and the fixing head 49 is designed to be coaxially engaged in the sleeve 44.

In some embodiments and in the example shown, the radial fingers 37*a*, 37*b* project into the sleeve 44 and the grooves 46*a*, 46*b* are formed in the periphery of the fixing head 49. For each groove 46*a*, 46*b*, the circumferential segment 36*a*, 36*b* extends circumferentially around the fixing head 49 and the axial segment 26*a*, 26*b* extends axially along the fixing head 49, from the circumferential segment 36*a*, 36*b* to the upper end of the fixing head 49.

In some embodiments and in the example shown, the handlebar stem body 9 comprises a central rod 30 extending in the centre of the sleeve 44 along the first axis of revolution B1, the locking hook 33 being accommodated inside the central rod 30. In the present case, in the example shown, the axial arm 33*a* of the hook 33 is accommodated in the central rod 30, while the radial arm 33*b* extends out of the central rod 30. The central rod 30 is hollow and defines a receiving portion 31 for the axial arm 33*a* of the hook 33. When the hook 33 pivots, it comes out of or goes back into the receiving portion 31 through an axial slot 31*a* provided along the central rod 30 and adjacent to the receiving portion 31. In the position in which the hook 33 has come out or is caught, the lower end of the axial arm 33*a* in the form of a hook projects out of the central rod 30 whereas, in the position in which the hook 33 has gone back in or is unhooked, the lower end of the axial arm 33*a* is integrally accommodated in the receiving portion 31. In this example, the central rod 30 is formed in one piece with the support 28 but other configurations can be envisaged.

In some embodiments and in the example shown, a central hole 43 is formed in the fixing head 49 for receiving the central rod 30 when the fixing head 49 is engaged in the sleeve 44. The central hole 43 and the central rod 30 both extend along the engagement axis A. The first notch 38 is formed in the lateral wall 45 delimiting the central hole 43. Similarly, when a second notch 39 is provided, the second notch 39 is formed in the lateral wall 45 delimiting the central hole 43.

In some embodiments and in the example shown, the handlebar stem 2 further comprises a clamping system for clamping the sleeve 44 against the fixing head 49 when the fixing head 49 is engaged in the sleeve 44. Such a system makes it possible to lock the relative position of the sleeve 44 in relation to the fixing head 49 while at the same time reducing the clearance between these parts. This makes it possible to obtain an even more stable and even more robust connection between the handlebar stem body 9 and the base 19. In the example, this system makes it possible to immobilize the handlebar stem body 9 in the use position and reinforces the locking established by the engagement of the hook 33 in the first notch 38.

In some embodiments and in the example shown, the sleeve 44 has a slot 17 extending along the sleeve 44 and the actuation of the clamping system makes it possible to reduce the spacing (i.e. the width) of the slot 17. In the example in the figures, the slot 17 extends from the free end of the sleeve 44. When the spacing of the slot decreases, the inside diameter of the sleeve 44 decreases and the sleeve 44 clamps the fixing head 49, thereby reducing the clearance between these parts.

In some embodiments and in the example shown, the clamping system comprises a cam lever 11 associated with a clamping rod 14. The slot 17 of the sleeve 44 is bordered by two pads 16*a*, 16*b* through which the clamping rod 14 passes. The actuation of the cam lever 11 makes it possible to move the two pads 16*a*, 16*b* closer to one another and thus to reduce the spacing of the slot 17.

The embodiments described in the present disclosure are given by way of non-limiting illustration, and a person skilled in the art can easily modify these embodiments, or envisage others, in the light of this disclosure while still remaining within the scope of the invention.

In particular, a person skilled in the art will easily be able to envisage variants which include only some of the features of the embodiments described above, if these features by themselves are enough to afford one of the advantages of the invention. In addition, the various features of these embodiments can be used on their own or combined with one another. When combined, these features may be as described above or different, and the invention is not limited to the specific combinations described in the present disclosure. In particular, unless specified otherwise, a feature which is described in relation to one embodiment can be applied to another embodiment.

What is claimed:

1. A bicycle handlebar stem comprising:

a handlebar stem body to which a bicycle handlebar can be fixed, and a base designed to be fixedly connected to a steering pivot of a bicycle, wherein the handlebar stem body comprises a fixing foot of cylindrical overall shape about a first axis of revolution, wherein the base comprises a fixing head of cylindrical overall shape about a second axis of revolution, wherein the fixing foot and the fixing head are designed to be coaxially engaged in one another, wherein the handlebar stem body can be detachably connected to the base by means of a bayonet fitting, and wherein the bayonet fitting makes it possible to connect the handlebar stem body to the base by pushing the handlebar stem body against the base, along an engagement axis, and then by rotating the handlebar stem body relative to the base, about the engagement axis, the bicycle handlebar stem further comprising a hook mounted on the handlebar stem body and designed to catch in a first notch formed in the base in order to immobilize the handlebar stem body in a use position in which the handlebar stem body is rotationally fixed to the base about the engagement axis and translationally fixed to the base along the engagement axis.

2. The bicycle handlebar stem of claim 1, wherein:

the bayonet fitting comprises at least one radial finger and at least one groove;

each groove comprises a circumferential segment in the form of a circular arc about the engagement axis and an axial segment parallel to the engagement axis; and each radial finger can be engaged and slide in the groove which corresponds to it.

3. The bicycle handlebar stem of claim 2, wherein:

the fixing foot is hollow and the fixing head is designed to be engaged inside the fixing foot; and each radial finger projects into the fixing foot and each groove is formed in the periphery of the fixing head.

4. The bicycle handlebar stem of claim 2, wherein:

when each radial finger is engaged in the groove which corresponds to it and when the hook is in an unhooked position, the handlebar stem body can be rotated relative to the base, about the engagement axis, between the use position in which the radial finger is at one end of the circumferential segment and a disconnection position in which the radial finger is at the other end of the circumferential segment in line with the axial segment;

in the use position, the axial movement of the handlebar stem body relative to the base is prevented by the engagement of the radial finger in the circumferential segment;

from the disconnection position, the handlebar stem body can be disconnected from the base by sliding the radial finger in the axial segment so as to bring the radial finger out of the groove.

5. The bicycle handlebar stem of claim 4, wherein the hook is designed to catch in a second notch formed in the base in order to immobilize the handlebar stem body in the disconnection position.

6. The bicycle handlebar stem of claim 4, wherein the use position and the disconnection position are angularly spaced by a rotational angle of 90°.

7. The bicycle handlebar stem of claim 1, wherein:

the fixing foot comprises a sleeve having the first axis of revolution as central axis; and the fixing head is designed to be coaxially engaged in the sleeve.

8. The bicycle handlebar stem of claim 7, wherein:

the handlebar stem body comprises a central rod extending in the centre of the sleeve along the first axis of revolution;

the hook is partially accommodated inside the central rod;

a central hole is formed in the fixing head for receiving the central rod when the fixing head is engaged in the sleeve; and the first notch is formed in the lateral wall delimiting the central hole.

9. The bicycle handlebar stem of claim 7, further comprising a clamping system for clamping the sleeve against the fixing head when the fixing head is engaged in the sleeve.

10. The bicycle handlebar stem of claim 7, wherein:

the handlebar stem body comprises a central rod extending in the centre of the sleeve along the first axis of revolution;

the hook is partially accommodated inside the central rod;

a central hole is formed in the fixing head for receiving the central rod when the fixing head is engaged in the sleeve; and a second notch is formed in the lateral wall delimiting the central hole.

11. The bicycle handlebar stem of claim 8, wherein:

the handlebar stem body comprises a central rod extending in the centre of the sleeve along the first axis of revolution;

the hook is partially accommodated inside the central rod;

a central hole is formed in the fixing head for receiving the central rod when the fixing head is engaged in the sleeve; and the first notch and a second notch are formed in the lateral wall delimiting the central hole.

* * * * *